Sept. 10, 1940.  E. B. BAVE  2,214,447
LIGHTING SYSTEM FOR AUTOMOBILES
Filed Jan. 11, 1939  4 Sheets-Sheet 1
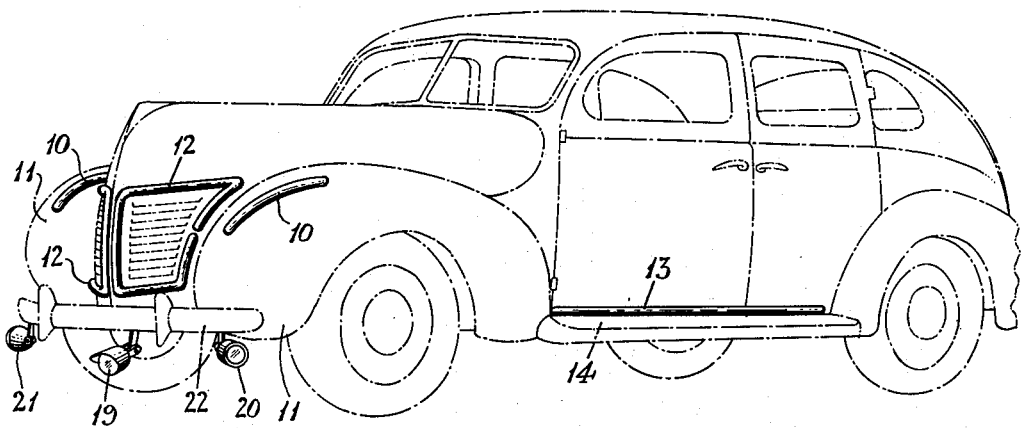
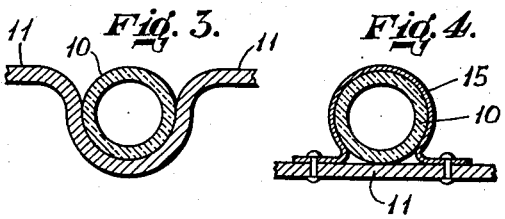
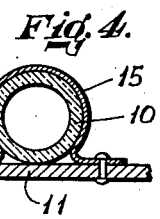
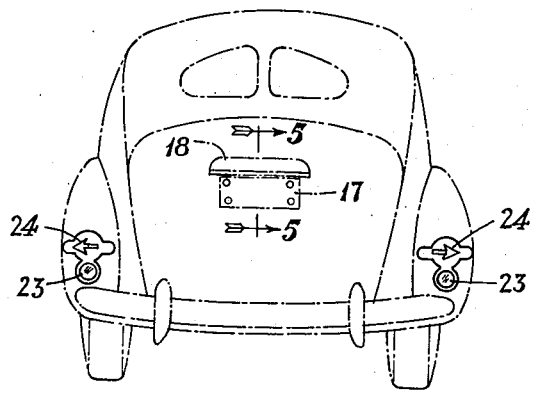
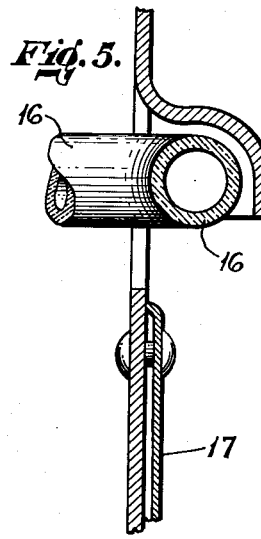
INVENTOR.
EDWIN B. BAVE
BY Richards & Geier
ATTORNEYS Sept. 10, 1940.     E. B. BAVE     2,214,447
LIGHTING SYSTEM FOR AUTOMOBILES
Filed Jan. 11, 1939     4 Sheets—Sheet 2
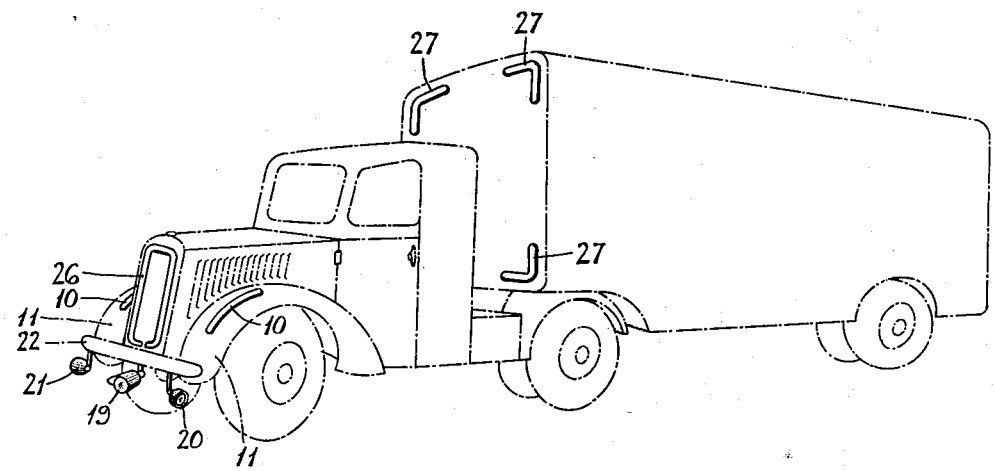
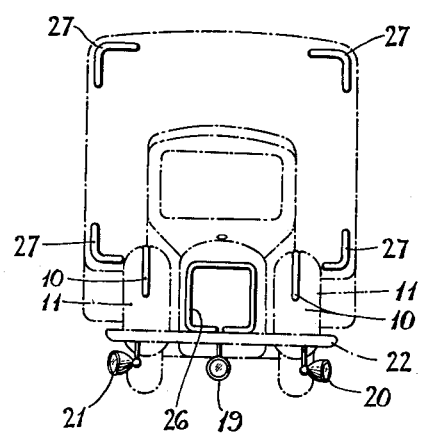
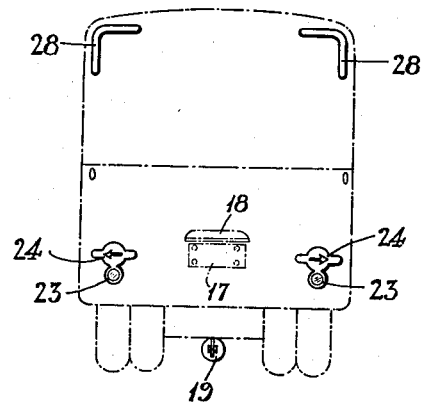
INVENTOR.
EDWIN B. BAVE
BY
Richards & Geier
ATTORNEY.

Sept. 10, 1940.    E. B. BAVE    2,214,447
LIGHTING SYSTEM FOR AUTOMOBILES
Filed Jan. 11, 1939    4 Sheets-Sheet 3

INVENTOR.
EDWIN B. BAVE
BY Richards & Geier
ATTORNEYS

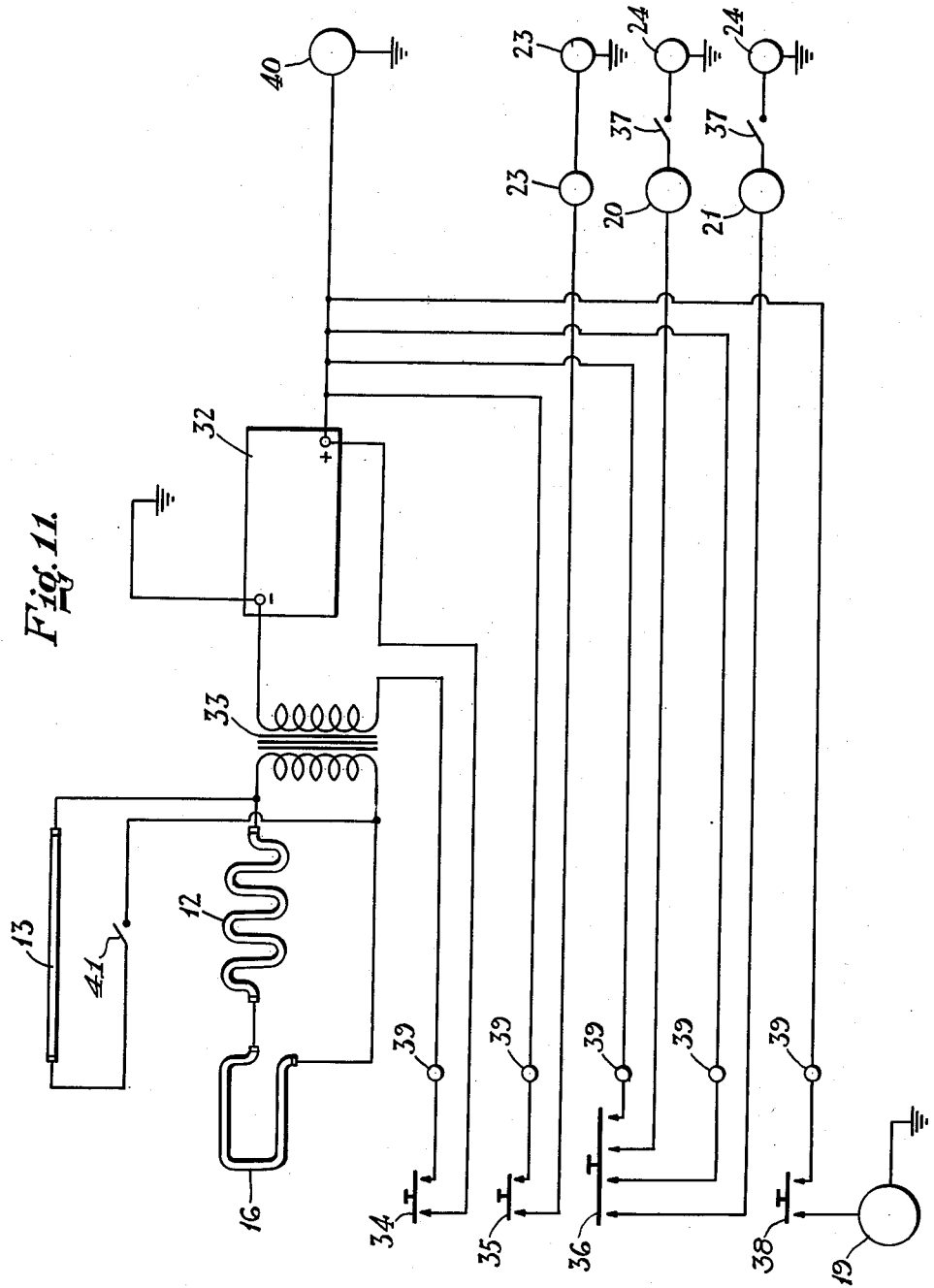

Patented Sept. 10, 1940

2,214,447

UNITED STATES PATENT OFFICE 2,214,447

LIGHTING SYSTEM FOR AUTOMOBILES

Edwin B. Bave, Plainfield, N. J.

Application January 11, 1939, Serial No. 250,294

2 Claims. (Cl. 240—7.1)

This invention relates to lighting systems for automobiles and the like, but more particularly to systems which partly utilize as a lightening medium neon or other rare gases.

One object of the invention is to provide a lighting system for automobiles and the like which eliminates glare and thus renders night driving less dangerous.

Another object is to provide a lighting system of the type indicated which will produce increased visibility to the driver and occupants of the automobile without any deleterious effects upon the driver of an oncoming vehicle.

A further object is to outline the vehicle clearly to eliminate the danger of collision.

Still a further object is generally to increase the safety of night driving.

These and other objects will become more apparent as the specification proceeds and when taken in conjunction with the accompanying drawings, showing a preferred embodiment of the inventive idea together with possible modifications, and in which:

Figure 1 is a perspective view of an automobile equipped with a lighting system according to the invention.

Figure 2 is a rear view of the automobile shown in Figure 1.

Figure 3 is a fractional enlarged view in cross section of one of the front fenders of the automobile shown in Figure 1.

Figure 4 is a view similar to Figure 3 of the modification.

Figure 5 is a sectional enlarged view taken along the line 5—5 of Figure 2.

Figure 6 is a perspective view of a truck equipped with a lighting system according to the invention.

Figure 7 is a front view thereof and

Figure 8 is a rear view thereof.

Figure 11 is a schematic view of a wiring diagram employed for the invention.

Figure 9:
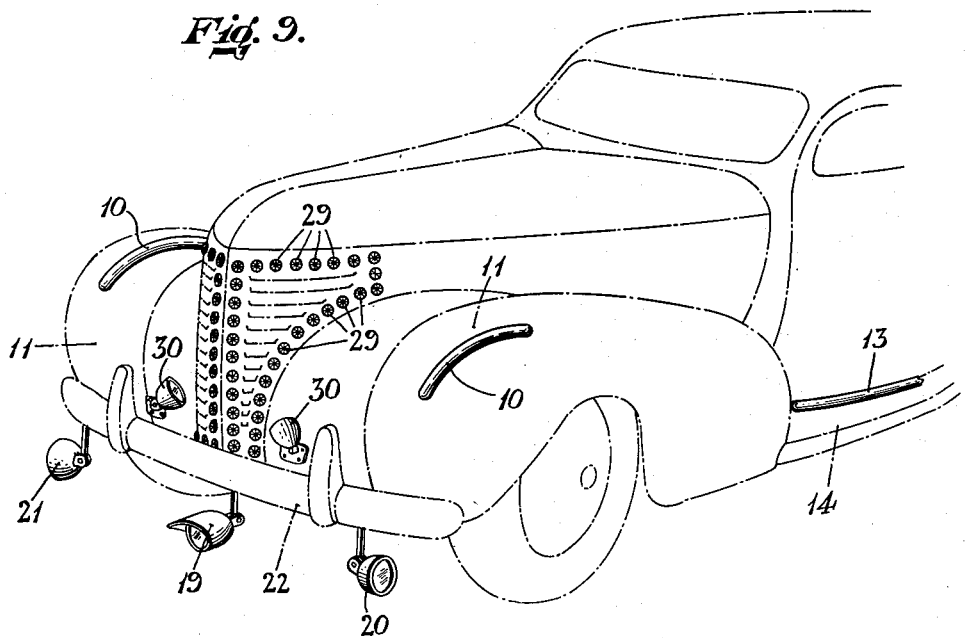
Figure 9 is a perspective view of an automobile having a modified form of an illuminating system according to the invention.

In carrying out the objects of the invention, the glaring headlights are replaced by tubes or chambers containing an excitable gas, such as neon, which are placed on the fenders or adjacent the engine hood. They may also be arranged around the radiator to outline the design thereof. If desired, tubes may also be placed along the running board, and at the rear to illuminate the rear license plate.

Referring in greater detail to the drawings:

Figure 1 shows an automobile having neon tubes 10 mounted on the front mud guards 11. Additional tubes 12 have been arranged to outline the radiator front. Additional tubes 13 are mounted along the running board 14.

These various tubes are formed of translucent material and are shaped to conform to the contour of the parts of the automobile on which they are arranged. They are filled with gases, such as neon or helium. These gases may be supplemented with suitable metallic vapors to emit certain desired colors when the gas is electrically excited. Tubes containing such metallic vapors may be used for decorative purposes, for instance, to produce the name or trade-mark of the automobile.

The tubes may be partially embedded in the part of the automobile to which they are applied as shown in Fig. 3 of the drawings and cushioned in a filler of plastic material to protect them against breakage. They may also be mounted on top of the particular vehicle part and held in place by bands or hoops 15 as shown in Figure 4.

A similar tube 16 is arranged at the rear of the automobile to illuminate the license plate 17. This tube is preferably equipped with a reflector 18 to concentrate the light upon the plate 17.

The aforementioned tubes serve simply as a safety factor with the possible additional purpose of decoration. The road is illuminated from three lights, 19, 20 and 21, of the ray or beam variety which are placed low on the front of the automobile. In other words, they are placed below the line of vision of the driver of an oncoming car and thus prevent the latter from becoming blinded. These lights may be attached to the bumper 22 of the automobile. The light 19 is preferably of the ray or spot variety and may be pivoted and its operation controlled from the driver's seat in the conventional manner. Thus it may be used to pick up doubtful objects on the road.

The lights 20 and 21 are permanently mounted to show the left and right hand side of the road, respectively. These lights may be used at the same time or individually.

These lights 20 and 21 may be placed in circuit, the rear stop lights 23 having an arrow 24 pointing right and left, respectively. The illumination of these arrows is controlled from the steering wheel in the conventional manner. In other words, the left arrow will be flashed on when the steering wheel is turned left and the right hand arrow flashed on when the wheel is turned to the right. At the same time, the lights 20 and 21 will also shine to light the road to be turned into and more clearly indicate to those behind the desire to turn and the place of the turn.

The modification shown in Figures 6 to 8, inclusive, represents a truck equipped with neon tubes 26 which outline the radiator. The outline of the truck is indicated by the angle tubes 27 at the top and bottom on the front end and by similar angle tubes 28 at the rear.

Figure 10:
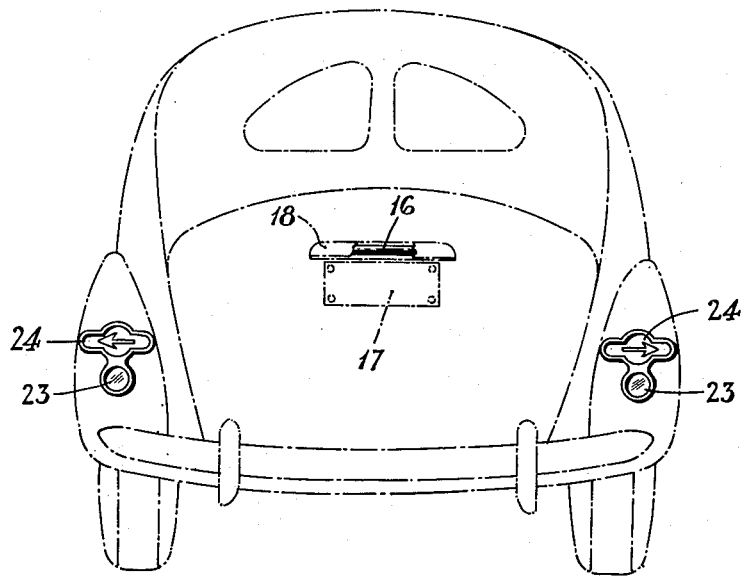
Figure 10 is a rear view thereof.

In the modification shown in Figures 9 and 10, the neon tubes outlining the radiator front have been replaced by reflector buttons 29. These buttons reflect the light from the relatively small lights 30 and 31 mounted on the cowling between the engine hood and the front fender.

This modification as well as the modification shown in Figures 6 to 8 have the same head lights 19, 20 and 21 and tail lights 23 and arrows 24 and license plate illuminating device as the embodiment shown in Figures 1 to 5.

It will be noted that in automobiles and similar vehicles the energy developed by the battery 32 (Figure 11) is usually of a low potentiality and therefore must be stepped up to provide a sufficiently high potential energy to illuminate the gas in the tubes. For this purpose a transformer 33 of conventional design may be interposed in the circuit between the battery and the tube connections.

As shown in Figure 11, the neon tubes are controlled by the switch 34 which may be mounted on the dash-board. The tail lamps 23 are similarly controlled by the switch 35 and the front lights 20 and 21 by the switch 36 on the steering wheel. The rear left and right hand arrows 24 are flashed on and off as the steering wheel is turned right or left by conventional automatic switches 37.

The spot-light 19 is controlled by the switch 38 which is also mounted on the dash-board. Pilot lights 39 may be provided to indicate whether the respective lights are on or off. The battery 32 is charged by the generator 40. The switch 41 serves to illuminate the tube 13 when the door of the automobile is open.

Having thus described the invention, the following is claimed:

1. An electric lighting system for automobiles and the like comprising a plurality of luminous non-glaring members devoid of beam or ray effect arranged on selected parts of the body of the automobile to indicate the outline thereof, and separate lights of the beam or ray type mounted below the front bumper of the automobile to illuminate the road to be traveled, said lights comprising a pair of side lights adjacent each end of the bumper and having their beams restricted to illuminate a predetermined portion of the side of the road, and a pivotally mounted central light operable from the driver's seat having its beam restricted to illuminate the road ahead.

2. An electric lighting system for automobiles and the like comprising a plurality of tubes containing electrically excitable gas arranged at predetermined points on the body of the automobile to outline the same, and separate lights of the beam variety mounted below the front bumper of the automobile for illuminating the road to be traveled, said lights comprising a side light adjacent each end of said bumper having their beams restricted to illuminate a predetermined portion of the side of the road, and a pivotally mounted central light operable from the driver's seat having its beam restricted to illuminate the road ahead.

EDWIN B. BAVE.